United States Patent [19]

Grazioli

[11] Patent Number: 4,519,412
[45] Date of Patent: May 28, 1985

[54] VALVE AND SEAL THEREFOR

[75] Inventor: Angal J. Grazioli, Houston, Tex.

[73] Assignee: Cameron Iron Works, Inc., Houston, Tex.

[21] Appl. No.: 500,082

[22] Filed: Jun. 1, 1983

[51] Int. Cl.³ .................. F16J 15/00; F16K 43/00; F16K 17/40
[52] U.S. Cl. .................. 137/72; 137/315; 251/174; 251/214; 251/315; 251/316; 251/317; 277/26; 277/63; 277/188 A
[58] Field of Search .................. 137/72, 315; 251/174, 251/214, 315, 316, 317; 277/22, 26, 63, 188 A

[56] References Cited

U.S. PATENT DOCUMENTS

| | | | |
|---|---|---|---|
| 2,916,254 | 12/1959 | Wendell | 251/315 |
| 2,973,978 | 3/1961 | Oppenheim | 277/188 A |
| 3,114,386 | 12/1963 | Dumm | 251/174 |
| 3,473,554 | 10/1969 | King | 251/315 |
| 3,576,153 | 4/1971 | Doutt | 277/63 |
| 3,630,483 | 12/1971 | Canalizo | 251/214 |
| 3,990,465 | 11/1976 | Allen | 251/174 |
| 4,273,148 | 6/1981 | Charland | 251/214 |
| 4,280,522 | 7/1981 | Pechnyo et al. | 251/174 |
| 4,340,204 | 7/1982 | Herd | 251/214 |
| 4,386,756 | 6/1983 | Muchow | 251/174 |

FOREIGN PATENT DOCUMENTS 2512465  10/1976  Fed. Rep. of Germany ...... 251/174

Primary Examiner—George L. Walton
Attorney, Agent, or Firm—Vinson & Elkins

[57] ABSTRACT

An ball valve having a body with an open valve chamber therein, passages into the valve chamber, an opening through the top of the body, a boss having an internal recess opposite and aligned with said opening, a closure releasably secured to said body and closing valve chamber, a ball positioned within said chamber and having a passage therethrough, an upper shaft extending through said opening and a lower shaft positioned in said boss recess, rotation of said upper shaft rotating said ball to control flow through said valve, and a sealing assembly positioned to seal against said ball and having resilient seals and metal seal rings for sealing against pressure independent of the direction of flow or pressure even after the valve has been exposed to sufficient heat to destroy the resilient seals of the sealing assembly.

13 Claims, 5 Drawing Figures

VALVE AND SEAL THEREFOR

BACKGROUND

Valves of the prior art which have a spherical type of valve member are called ball valves and generally have had an opening at the top of the body through which the ball and seals are installed into the body. Some prior art valves have provided an end entry for the ball or valve member so that the ball and seals could be installed from the end of the body and then a body closure secured over such end opening to seal the ball and seals therein and to provide one of the passages communicating into the valve.

Some of these prior valves, such as shown in U.S. Pat. No. 4,184,507, did not provide both upper and lower shafts on which the ball is mounted for rotation in the valve chamber within the body. Other valves, such as is shown in U.S. Pat. No. 4,137,936 and U.S. Pat. No. 3,656,498, provide both upper and lower openings through which the respective upper and lower shafts could be removed from the body after the closure members on such openings had been removed.

Prior ball valves have included both upstream and downstream seal rings against which the ball seals. U.S. Pat. No. 4,254,793 is illustrative of a ball valve having both upstream and downstream seals and the types of seals which are used therefor. U.S. Pat. No. 3,656,498, in addition to having the above mentioned upper and lower shafts, discloses a ball valve having only a single seal ring against which the ball is to seal both upstream and downstream. U.S. Pat. No. 4,206,904 discloses another end entry ball valve with a single seal ring against which the ball is to seal both upstream and downstream. This valve includes a ball which has a shaft on one side which projects into a recess in the body and a plug on the other side which engages in a window in the body and in a recess in the ball. When the end closure and the plug are removed, the body is sufficiently oversized so that the ball can then be pivoted to be removed through the end opening.

None of these references teach the use of a ball valve having an end entry through which the ball is readily removable and which does not require openings through the body for the shafts and the outer closures to seal such openings. Further none of these references teach an end entry ball valve through which the ball is readily removed without requiring that the valve body be oversized to allow pivoting of the ball. Also, none of these prior art patents suggest that a single seal ring could be used for a ball valve seal which would seal against pressure from both directions and provide a seal even after the valve had been exposed to sufficient temperature or fire to destroy or deteriorate the resilient seals.

SUMMARY

The present invention relates to an improved end entry ball valve having a body with a valve chamber and passages communicating with the valve chamber, closure for engaging said body and closing the valve chamber, means for securing the closure to the body, a ball positioned in said valve chamber, a first shaft extending through the upper portion of the body into the ball, a second shaft engaging in an opening in said ball opposite said first shaft, a passage through said ball, means for rotating said upper shaft to rotate said ball whereby said passage through said ball communicates between said body passage and said closure passage or whereby said ball closes such communication through the body, a seal ring positioned between the ball and the wall surrounding the opening of one of said passages into the valve chamber, said seal ring having means for urging it into engagement with the exterior of the ball, means for sealing against said ball and a resilient seal for sealing between the seal ring and said wall, said sealing means including a resilient seal, a first metal ring sealing between said sealing ring and said wall when pressure is exerted from one of said passages, a second metal ring sealing between said sealing ring and said wall when pressure is exerted from the other of said passages, and means urging said resilient seal into sealing engagement with said sealing ring and said wall.

An object of the present invention is to provide an improved ball valve having substantial support for rotation of the ball.

Another object is to provide an improved ball valve which is easily and quickly assembled and disassembled.

A further object is to provide an improved ball valve having a single sealing assembly for sealing against pressure from upstream or downstream and which seals even after the sealing assembly has been subjected to sufficient temperature to destroy or deteriorate the resilient seals.

Still another object of this invention is to provide an improved ball valve with a shaft mounted ball which requires only one shaft closure and does not require an oversized body to facilitate removal of the ball.

BRIEF DESCRIPTION OF THE DRAWINGS

These and other objects and advantages of the present invention are hereinafter set forth and explained with reference to the drawings wherein.

DESCRIPTION OF THE PREFERRED EMBODIMENT

Figure 1:
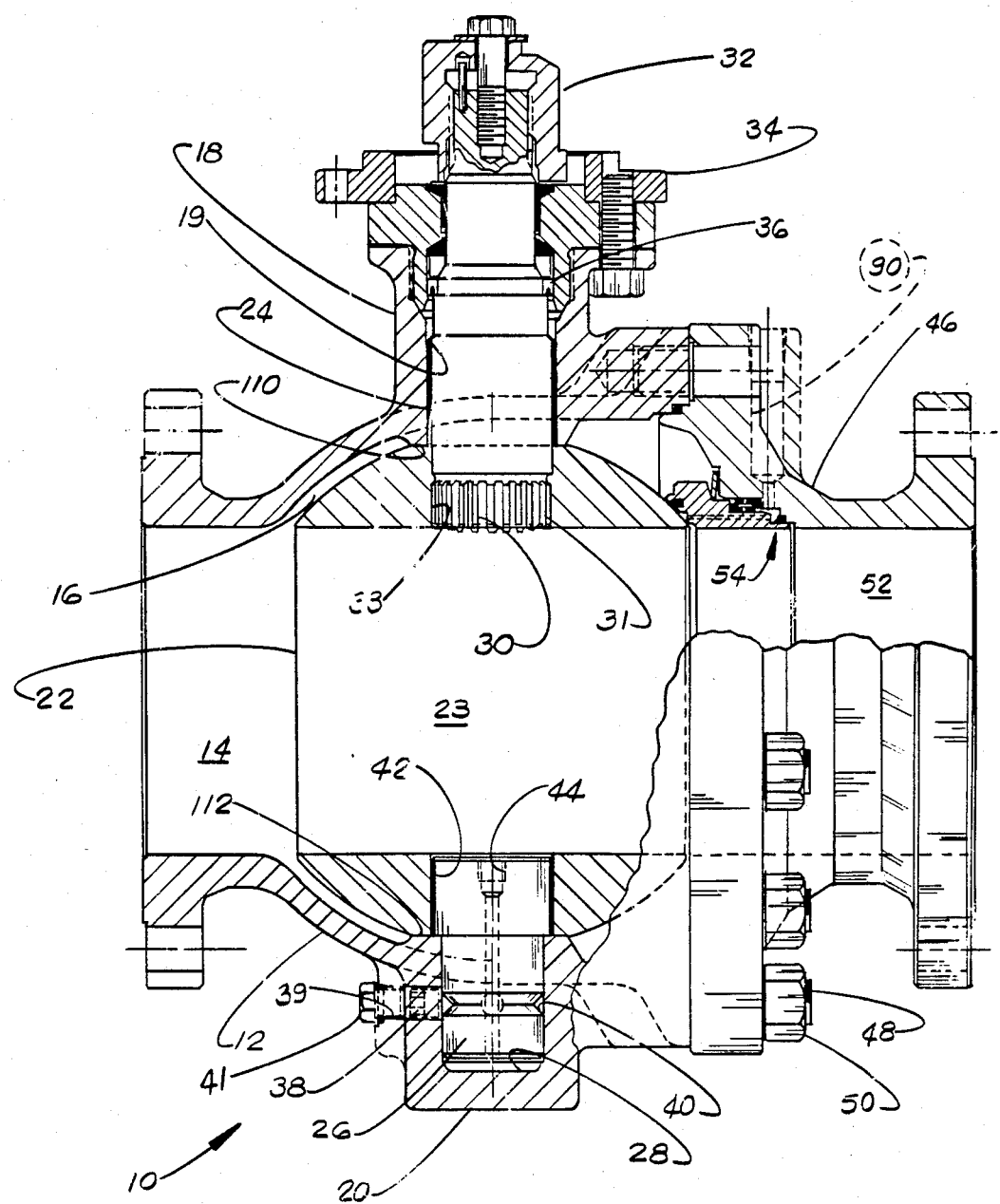
FIG. 1 is a sectional view of the preferred embodiment of the improved ball valve of the present invention.

As shown in FIG. 1, valve 10 is the improved end entry ball valve of the present invention. Valve 10 includes body 12 having passage 14 extending therethrough into valve chamber 16, upper neck 18 and lower boss 20. Ball 22 with passage 23 therethrough is positioned within chamber 16 and is supported for rotation on upper shaft 24 which extends through upper neck 18 and lower shaft 26 which extends into internal recess 28 in the interior of lower boss 20. Upper shaft 24 includes splined portion 31 which engages with splined hole 33 of ball 22 to form splined joint engagement 30 and includes an outer portion 32 extending beyond flange 34 which closes the opening through upper neck 18 and outer portion 32 is provided with a suitable shape for engagement by a means for rotating upper shaft 24 and ball 22 such as a handwheel or rotary actuator. Suitable upper shaft sealing means 36 is provided around upper shaft 24 for sealing between upper shaft 24 and the interior of upper neck 18. Lower shaft 26 is positioned in recess 28 and is held therein by pin 38 which is inserted into threaded hole 39 of lower boss 20 and engages in groove 40 around the exterior of lower shaft 26. Metal-to-metal seal plug 41 is inserted into threaded hole 39 to sealingly engage boss 20. Pine 28, thread hole 39 and plug 41 are shown in FIG. 1 but rotated 90° to show in section. The upper end of lower shaft 26 extends into opening 42 through the lower portion of ball 22. Hole 44 in the upper end of lower shaft 26 is threaded to receive a threaded rod (not shown) as hereinafter described.

Figure 4:
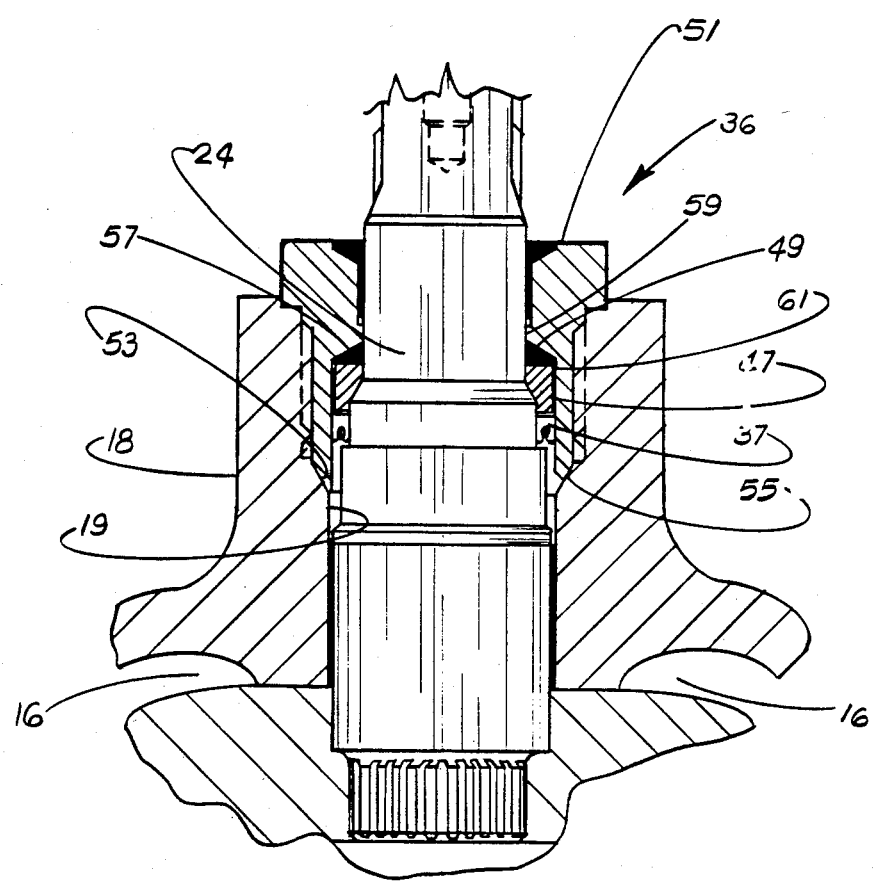
FIG. 4 is enlarged sectional view of the upper shaft sealing means used in the present invention.
Figure 5:
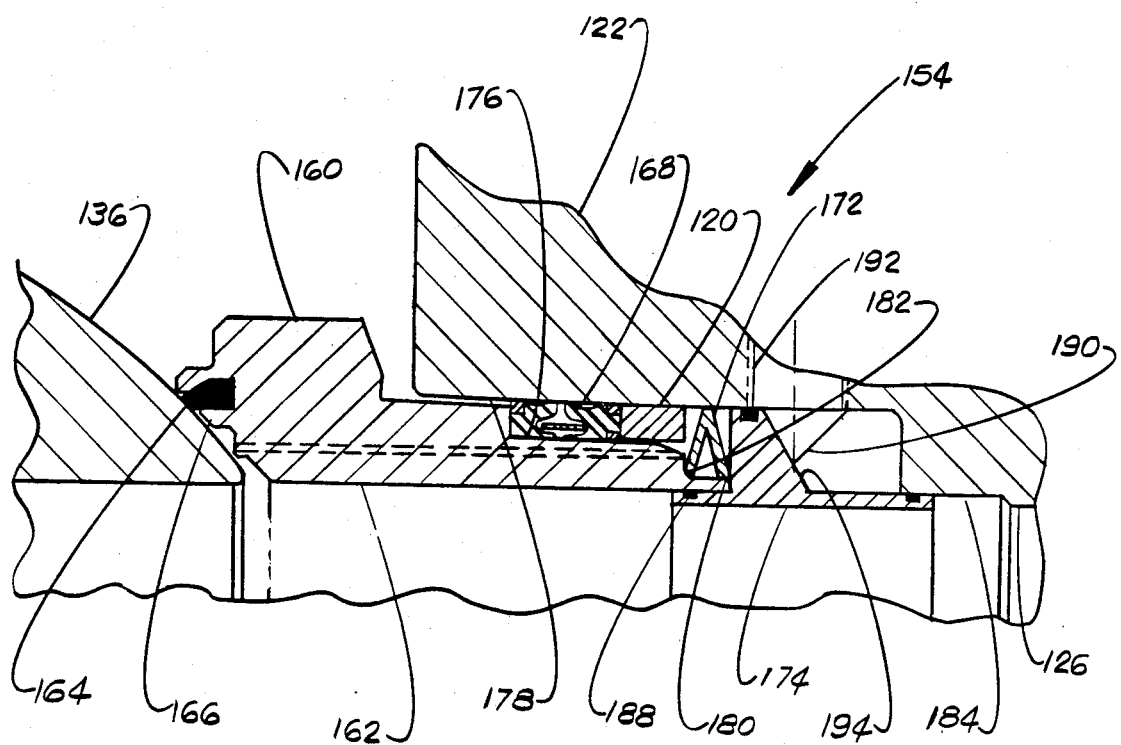
FIG. 5 is a partial sectional view illustrating the improved sealing assembly of the valve shown in FIG. 3.

Upper shaft sealing means 36 is best shown in FIG. 4 wherein primary seal 37 seals the annular space between shaft 24 and packing gland nut 51 below metal seal ring 47, which is below secondary packing 49. In the event of a fire, secondary packing 49 and primary seal 37 will both be destroyed. Fluid pressure in chamber 16 will cause metal seal ring 47 to move upward until its outermost upper edge 61 engages frusto-conical surface 57 of packing gland nut 51 and thereby form a metal-to-metal seal between surface 59 of shaft 24 and surface 57 of nut 51 in the area that was previously occupied by secondary packing 49. Packing gland nut 51 has lower frusto-conical surface 55 which engages frusto-conical surface 53 of opening 19 in the interior of upper neck 18 to form a metal-to-metal seal.

Figure 2:
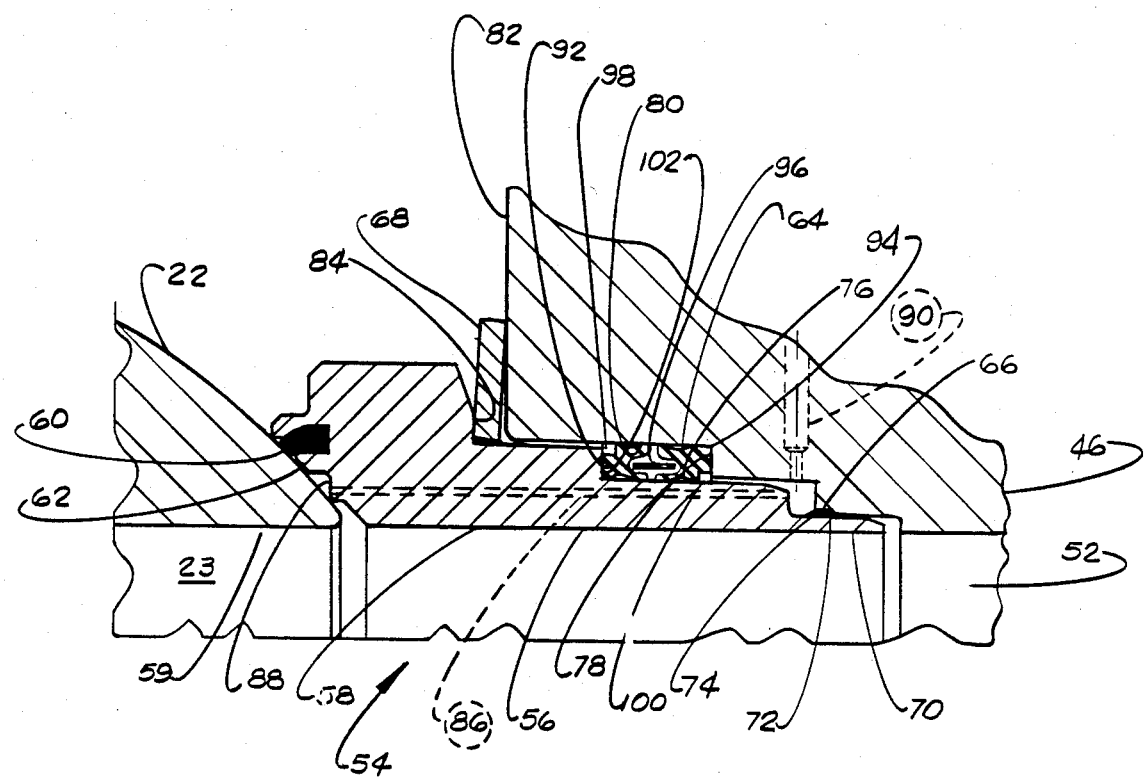
FIG. 2 is a partial sectional view illustrating the improved sealing assembly of the valve shown in FIG. 1.

End closure 46 is secured to body 12 by suitable means such as studs 48 and nuts 50, and forms the other boundary of chamber 16 and includes passage 52 extending therethrough. Sealing assembly 54 (as best shown in FIG. 2) includes metal ring 56 having central bore 58 which is substantially the same diameter as passages 14 and 52 and also passage 23. Sealing assembly 54 also includes resilient seal ring 60 in surface 62 of metal ring 56 for sealing against the exterior of ball 22 as shown, two-way seal ring 64, seal ring 66 and spring 68. Surface 62 of metal ring 56 is shaped to engage ball 22 in metal-to-metal sealing engagement in the event that seal ring 60 is destroyed by fire while in service. Seal ring 66 is positioned around the exterior of lip 70 on metal ring 56 and engages shoulder 72 and wall surface 74 on the interior of closure 46. Two-way seal ring 64 surrounds and engages exterior surface 76 of metal ring 56 and is in sealing engagement with shoulder 78 of end closure 46 and internal wall surface 80 of end closure 46. Spring 68 is a Belleville washer type of spring and engages between shoulder 82 on the interior of end closure 46 and shoulder 84 on the exterior of metal ring 56. Port 86 extends through metal ring 56 from recess 88 immediately inward of sealing surface 62 to the space between seal ring 66 and two-way seal ring 64. Passageway 90 extends through end closure 46 to communicate with the space between rings 64 and 66. A leak in seal ring 60 may be stopped by using passageway 90 to inject a sealant material (not shown) into the space between rings 64 and 66 and into port 86 and thereby into recess 88.

Two-way seal ring 64 includes resilient seal ring 92 and resilient seal ring 94 which are of substantially the same construction but which have their sealing lips facing each other with metal spacer ring 96 positioned in the opening between the sealing lips of each of rings 92 and 94. One other difference in structure between rings 92 and 94 is that ring 92 includes metal seal ring 98 in the outer corner of its outer surface and ring 94 includes metal seal ring 100 in the inner corner of its inner surface. In the event that valve 10 is subjected to sufficient heat to destroy or deteriorate resilient seal rings 92 and 94, metal ring 98 will seal between shoulder 102 on metal ring 56 and internal surface 80 on closure 46 whenever the pressure is exerted from the direction of passage 52 and metal ring 100 will seal between shoulder 78 on closure 46 and external surface 76 on metal ring 56 whenever the pressure is exerted from the direction of passage 14 and chamber 16. Thus, metal seal rings 98 and 100 provide a continuous seal against pressure from either direction even when the resilient seals 64 and 66 have been destroyed.

Assuming that seal assembly 54 or ball 22 is to be changed, such change is accomplished by removing nuts 50 from studs 48 and withdrawing closure 46 from body 12. In this manner sealing assembly 54 is easily removed and replaced. Also with closure 46 removed, ball 22 can be removed by removing upper shaft 24 and then threading a rod into the threaded opening 44 in the upper portion of lower shaft 26 and after removing seal plug 41 and locking pin 38 lower shaft 26 is withdrawn through splined hole 33 of ball 22 and the interior of upper neck 18. With both shafts 24 and 26 removed ball 22 is positioned in engagement between upper boss 110 and lower boss 112 of body 12 but such engagement does not provide any appreciable resistance to the removal of ball 22 from chamber 16. The reinstallation of ball 22 and sealing assembly 54 proceeds with the opposite steps from the removal steps.

Figure 3:
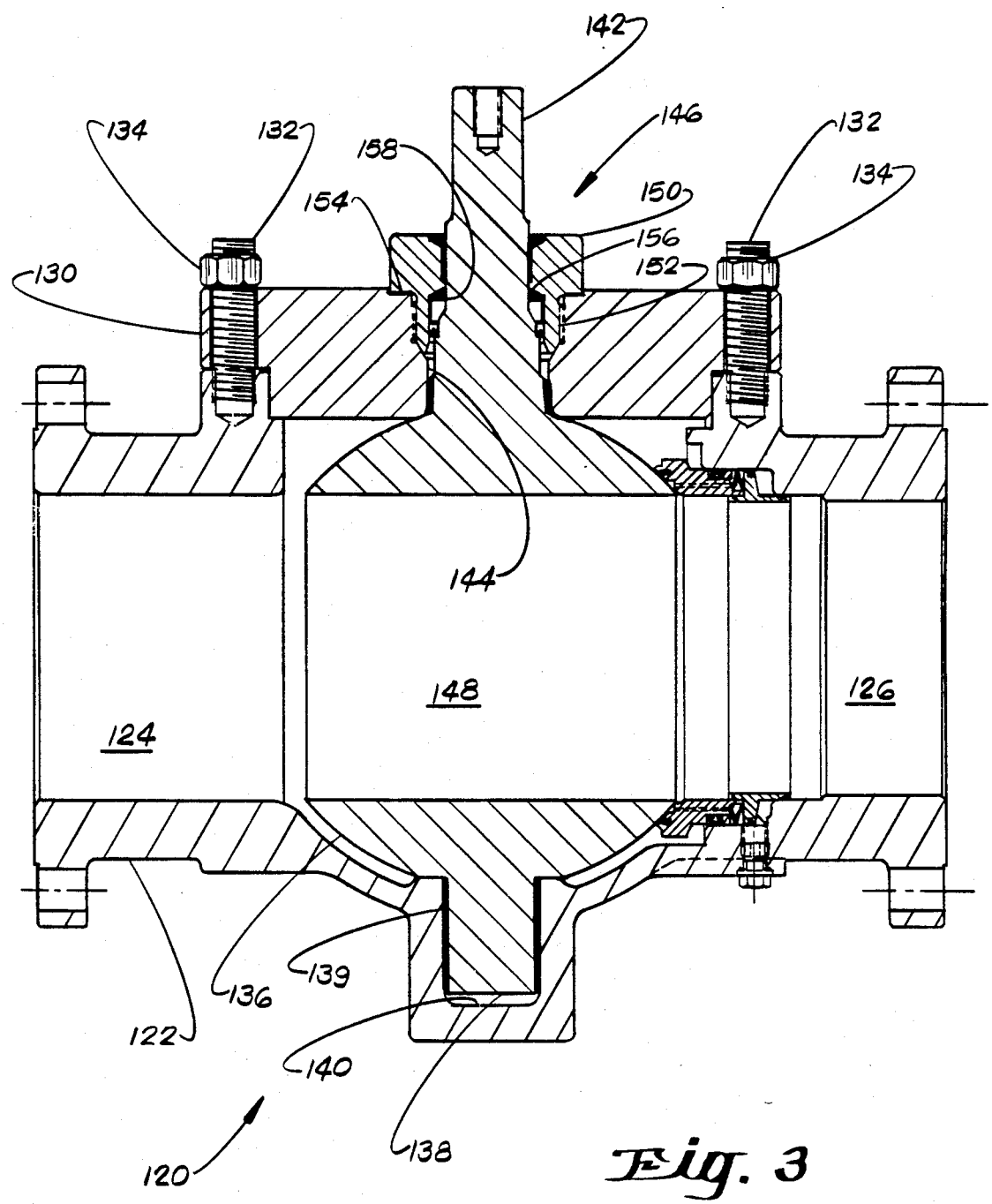
FIG. 3 is a sectional view of a second embodiment of the improved ball valve of the present invention.

Valve 120 is shown in FIG. 3 as a modified form of the improved structure of the present invention. Valve 120 includes body 122 having passages 124 and 126 communicating with valve chamber 128 and bonnet closure 130 is secured to body 122 by studs 132 and nuts 134 to close the opening of valve chamber 128 as shown. Ball 136, which functions as a valve member, is positioned in bearing 139 in valve chamber 128 with its lower shaft 138 positioned in internal recess 140 and its upper shaft 142 extending through opening 144 in bonnet closure 130. Suitable resilient sealing means 146 is provided for sealing between upper shaft 142 and bonnet closure 130. Passage 148 extends through ball 136 and is substantially the same size as passages 124 and 126.

Sealing means 146 includes collar 150 with depending annular lip 152 which threads into opening 144. Metal ring 154 is positioned between the interior of lip 152 and the exterior of shaft 142. Resilient seal 156 is positioned above ring 154 and against tapered surface 158 on the upper interior of lip 152. In the event of fire, metal ring 154 is forced into sealing engagement between surface 158 and the exterior of shaft 142.

Sealing assembly 154 is positioned in passage 126 to provide a seal between ball 136 and the interior walls of passage 126. Sealing assembly 154 includes metal ring 160 having central bore 162 therethrough and resilient seal ring 164 in surface 166 of metal ring 160 for sealing against the exterior of ball 136. Sealing assembly 154 also includes two-way seal ring 168, follower ring 170, spring 172 and sliding support ring 174. Surface 166 of metal ring 160 is shaped to engage ball 136 in metal-to-metal sealing engagement in the event seal ring 164 is destroyed while in service. Two-way seal ring 168 surrounds and seals against exterior surface 176 of metal ring 160 and also seals against interior wall surface 178 on body 122. Spring 172 engages shoulder 180 on supporting ring 174 and shoulder 182 on metal ring 160 to urge metal ring 160 toward ball 136. Support ring 174 is positioned in counterbore 184 in passage 126 and includes rim 186 extending outward to provide shoulder 180. The inner end of support ring 174 extends within metal ring 160 and is sealed thereto by O ring 188. Pin 190 is threaded into tapped hole 192 in body 122 and engages tapered surface 194 on rim 186 of support ring 174 to hold it in position. For assembly, pin 190 is removed and sealing assembly 154 is inserted into passage 126 as far as it will travel. This allows ball 136 to be inserted into valve chamber 128 and then sealing assembly 154 is moved into engagement with ball 136 and pin 190 is threaded inward into wedging engagement with surface 194 to move support ring 174 and the remainder of sealing assembly 154 toward ball 136. When sealing assembly 154 is in its desired position plug 196 is threaded into tapped hole 192 and provides a metal-to-metal seal in hole 192 to prevent leakage therethrough.

Valve 120 is substantially the same as valve 10 except that it is a top opening valve rather than an end opening valve. Sealing assembly 154 is substantially the same as sealing assembly 54 except that provision is made to move it aside for entry of ball 136 during assembly.

What is claimed is:

1. A ball valve comprising
a body having a valve chamber therein with an opening and with a pair of opposed passages communicating with said chamber,
a closure secured to said body and closing the opening into said chamber,
a ball positioned in said chamber and having a passage extending therethrough,
means for mounting the ball for rotation in said chamber to control flow through said body passages,
a metal seat ring seat assembly for providing a seating surface for one side of the ball a first shoulder surface being defined within the valve body, a second shoulder surface being defined within the metal seat ring assembly so that when the metal seat assembly is inserted into the valve body an annular groove is defined by said shoulder surfaces,
a single sealing assembly surrounding the opening of one of said body passages into said valve chamber and including a pair of pressure responsive dual resilient cup shaped sealing rings, said sealing rings each having an open end and a closed end, being responsive to line pressure at their open ends and facing in opposite directions within said annular groove for sealing between said ball and said one of said body passages independent of the direction of flow or pressure,
a pair of metal seal rings disposed within a surface of the dual seal rings providing a metal-to-metal seal between the seat ring and the valve body on opposite sides of said annular groove, and
said ball being spaced from the opening of the other body passage into said valve chamber.

2. A ball valve according to claim 1 wherein
said body has a top opening, and
said closure is secured to said body to close said top opening.

3. A ball valve according to claim 2 including
an upper shaft and a lower shaft on said ball,
said housing forming a lower internal recess to receive said lower shaft,
said closure having an opening through which said upper shaft extends, and
means for sealing between said upper shaft and said closure.

4. A ball valve according to claim 3 wherein said shaft and closure sealing means includes a metal-to-metal seal.

5. A ball valve according to claim 2 wherein
said sealing assembly is movable in said valve chamber away from said ball to allow entry and removal of said ball, and includes means for urging said sealing assembly toward said ball.

6. A ball valve according to claim 1 wherein
said body has an end opening,
said closure is secured to said body over said end opening and includes one of said pair of opposed passages.

7. A ball valve according to claim 6 including
an upper shaft and a lower shaft on said ball,
said body forming a lower internal recess to receive said lower shaft,
an opening through said body to receive said upper shaft, and
means for sealing between said upper shaft and the walls of said opening.

8. A ball valve according to claim 7 including
means for releasably securing said lower shaft in said recess.

9. A ball valve according to claim 8 including
means on said lower shaft for connecting a removal rod thereto for removal through said upper opening.

10. A ball valve according to claim 9 wherein said connecting means includes:
a threaded opening in the upper end of said lower shaft.

11. A ball valve according to claim 1 including means for resiliently urging said single sealing assembly toward said ball.

12. A sealing assembly for sealing in a ball valve having a body with a valve chamber therein, a ball positioned within said valve chamber and spaced from the interior of said body and a closure, comprising
a metal seat ring having an annular sealing surface for engaging the exterior surface of the ball and a groove in said annular sealing surface,
a resilient seal ring in said groove, and
a two-way seal ring for sealing between the exterior of the ring and the walls of the body surrounding said ring,
said two-way ring including both a dual resilient seal for sealing against pressure from both directions and each of said resilient rings having a metal seal ring, said two-way seal further includes a first resilient seat ring for sealing against upstream pressure, a second resilient seal ring for sealing against downstream pressure, said first and second seal rings being disposed within an annular groove defined a shoulder within said valve body and a shoulder within said metal seat ring, a first metal seal ring embedded in said first resilient seal ring for sealing against upstream pressure when said first resilient seal ring has been destroyed, a second metal seal ring embedded in said second resilient seal ring for sealing against downstream pressure when said second resilient seal ring has been destroyed and said first and second metal seal rings being disposed on opposite sides of said first and second resilient seal rings.

13. A sealing assembly according to claim 12 including
means for resiliently urging said metal ring in its sealing direction.

* * * * *

UNITED STATES PATENT AND TRADEMARK OFFICE
CERTIFICATE OF CORRECTION

PATENT NO. : 4,519,412

DATED : May 28, 1985

INVENTOR(S) : Angel J. Grazioli

It is certified that error appears in the above—identified patent and that said Letters Patent is hereby corrected as shown below:

Change the name of the Inventor from "Angal J. Grazioli" to -- Angel J. Grazioli --.

Column 5, line 34, after "ball", insert a comma (,);

Column 5, line 38, before "assembly", insert -- ring --.

Claims 1 and 12 are rewritten below to insert paragraphs where omitted during printing of the patent.

1. A ball valve comprising
    a body having a valve chamber therein with an opening and with a pair of opposed passages communicating with said chamber,
    a closure secured to said body and closing the opening into said chamber,
    a ball positioned in said chamber and having a passage extending therethrough,
    means for mounting the ball for rotation in said chamber to control flow through said body passages,
    a metal seat ring seat assembly for providing a seating surface for one side of the ball,
    a first shoulder surface being defined within the valve body,
    a second shoulder surface being defined within the metal seat ring assembly so that when the metal seat ring assembly is inserted into the valve body an annular groove is defined by said shoulder surfaces,

UNITED STATES PATENT AND TRADEMARK OFFICE
CERTIFICATE OF CORRECTION

PATENT NO. : 4,519,412

DATED : May 28, 1985

INVENTOR(S) : Angel J. Grazioli

It is certified that error appears in the above—identified patent and that said Letters Patent is hereby corrected as shown below:

a single sealing assembly surrounding the opening of one of said body passages into said valve chamber and including a pair of pressure responsive dual resilient cup shaped sealing rings, said sealing rings each having an open and a closed end, being responsive to line pressure at their open ends and facing in opposite directions within said annular groove for sealing between said ball and said one of said body passages independent of the direct of flow or pressure, a pair of metal seal rings disposed within a surface of the dual seal rings providing a metal-to-metal seal between the seat ring and the valve body on opposite sides of said annular groove, and said ball being spaced from the opening of the other body passage into said valve chamber.

12. A sealing assembly for sealing in a ball valve having a body with a valve chamber therein, a ball positioned within said valve chamber and spaced from the interior of said body and a closure, comprising a metal seat ring having an annular sealing surface for engaging the exterior surface of the ball and a groove in said annular sealing surface, a resilient seal ring in said groove, and a two-way seal ring for sealing between the exterior of the ring and the walls of the body surrounding said ring, said two-way seal ring including both a dual resilient seal for sealing against pressure from both directions and each of said resilient rings having a metal seal ring,

UNITED STATES PATENT AND TRADEMARK OFFICE
CERTIFICATE OF CORRECTION

PATENT NO. : 4,519,412

DATED : May 28, 1985

INVENTOR(S) : Angel J. Grazioli

It is certified that error appears in the above—identified patent and that said Letters Patent is hereby corrected as shown below:

said two-way seal further includes a first resilient seat ring for sealing against upstream pressure,
      a second resilient seal ring for sealing against downstream pressure,
      said first and second seal rings being disposed within an annular groove defined a shoulder within said valve body and a shoulder within said metal seal ring,
      a first metal seal ring embedded in said first resilient seal ring for sealing against upstream pressure when said first resilient seal ring has been destroyed,
      a second metal seal ring embedded in said second resilient seal ring for sealing against downstream pressure when said second resilient seal ring has been destroyed and said first and second metal seal rings being disposed on opposite sides of said first and second resilient seal rings.

Signed and Sealed this

Twenty-first Day of January 1986

[SEAL]

Attest:

DONALD J. QUIGG

Attesting Officer      Commissioner of Patents and Trademarks